US006745133B2

(12) United States Patent
Axelsson

(10) Patent No.: US 6,745,133 B2
(45) Date of Patent: Jun. 1, 2004

(54) MASS SPECTRAL PEAK IDENTIFICATION

(75) Inventor: Jan Axelsson, Uppsala (SE)

(73) Assignee: Amersham Biosciences AB, Uppsala (SE)

( * ) Notice: Subject to any disclaimer, the term of this patent is extended or adjusted under 35 U.S.C. 154(b) by 38 days.

(21) Appl. No.: 10/220,930

(22) PCT Filed: Mar. 7, 2001

(86) PCT No.: PCT/SE01/00486

§ 371 (c)(1),
(2), (4) Date: Oct. 30, 2002

(87) PCT Pub. No.: WO01/67485

PCT Pub. Date: Sep. 13, 2001

(65) Prior Publication Data

US 2003/0109990 A1 Jun. 12, 2003

(30) Foreign Application Priority Data

Mar. 7, 2000 (SE) .............................................. 0000754

(51) Int. Cl.[7] ............................ G01N 3/00; G06F 19/00
(52) U.S. Cl. ........................................................ 702/27
(58) Field of Search ......................... 702/27, 30; 435/6; 422/65, 71; 560/41; 250/296, 282, 338, 339, 281; 204/192.1

(56) References Cited

U.S. PATENT DOCUMENTS

| | | | | |
|---|---|---|---|---|
| 3,793,063 A | * | 2/1974 | Wiley | 204/192.1 |
| 4,723,076 A | * | 2/1988 | Bateman | 250/296 |
| 5,247,175 A | | 9/1993 | Schoen et al. | |
| 5,910,655 A | | 6/1999 | Skilling | |
| 6,104,027 A | | 8/2000 | Gee et al. | |
| 6,353,128 B1 | * | 3/2002 | Goodson et al. | 560/41 |

FOREIGN PATENT DOCUMENTS

| | | |
|---|---|---|
| GB | 2 333 893 | 8/1999 |
| JP | 8-17391 | 1/1996 |

OTHER PUBLICATIONS

C. Steinbeck, et al. "MASP—A Program Predicting Mass Spectra of Combinatorial Libraries", Journal of Chemical Information and Computer Sciences, vol. 37, May–Jun. 1997, ACS, USA, pp. 449–457.

A. Henderson, et al. "Computer peak identification in SIMS and comparison with XPS chemical state identification. EMAG–MICRO 89", Proceedings of the Institute of Physics Electron Microscopy and Analysis Group and Royal Microscopy Society Conference, London, UK, Sep. 13–15, 1989, pp. 335–338, vol. 1.

C. L. Do Lago, et al. "New method of isotope pattern analysis", Computers Chem. vol. 15, No. 2, pp. 149–155, 1991, UK.

* cited by examiner

*Primary Examiner*—John Barlow
*Assistant Examiner*—Tung Lau
(74) *Attorney, Agent, or Firm*—Royal N. Ronning, Jr.; Stephen G. Ryan; Yonggang Ji

(57) ABSTRACT

The monoisotopic mass peak of an experimentally obtained mass spectrum (262) for a sample molecule is determined using a cross correlation method. A model spectrum (261), having a known monoisotopic peak position, is created based on knowledge of the sample molecule. A set of correlation values are calculated from intensity values $I_{MODEL}$, $I_{EXP}$ for a selected mutual alignment between the spectra. A cross correlation analysis is used to find the best agreement between the model and the experimental mass spectrum, represented by a best value of a quality factor. The position of the monoisotopic peak of the model spectrum showing the best agreement with the experimental mass spectrum is selected as the best approximation of the monoisotopic peak of the experimental spectrum. Knowing the charge state of the analysed section of the mass spectrum it is possible to determine the monoisotopic mass of the sample molecule.

5 Claims, 5 Drawing Sheets

MASS SPECTRAL PEAK IDENTIFICATION

TECHNICAL FIELD OF THE INVENTION

The present invention relates to the identification of peaks of a mass spectrum obtained by mass spectrometry, and more specifically to a method for determining a measure of the mono-isotopic mass of a molecule such as a polymer or a bio-molecule.

TECHNICAL BACKGROUND OF THE INVENTION

The mass of a molecule, such as a bio-molecule or a polymer, can be determined using mass spectrometry. With this method a sample for analysis is ionized and analysed in a mass spectrometer to determine a mass spectroscopic data set, which usually is presented as a mass spectrum. The mass spectrum exhibits intensity peaks that are associated with the mass, or more specifically with the mass-to-charge ratio, of the molecule.

The technology associated with mass spectroscopy is well known, and is thoroughly described in numerous publications such as "Mass Spectrometry Principles and Applications", E. De Hoffmann, J. Charette, V. Stroobart; John Wiley & Sons Ltd, Chichester and "Mass Spectrometry of Biological Materials", B. S. Larsen, C. N. McEvans, Marcel Dekker Inc., New York.

It should be pointed out, that depending on the equipment used the mass estimation obtained could relate either to a molecule or to an ion. In the case that the mass spectrometer ionizes the molecule by adding hydrogen ions, the mass obtained should be reduced with the weight of the charge carrying hydrogen ions. However, for simplicity of the description, and since this circumstance is well known within the art, only the term "molecule" will be used below.

Today, the most common way to determine the position, i.e. the mass-to-charge ratio, of an individual peak is probably the "centroiding method". With this method, after having isolated a specific peak of the mass spectrum a start point SP at the positive slope of the peak ("the low mass end") and an end point EP at the negative slope ("the high mass end") are determined. Using a geometrical analogy, the top of the peak is defined as that mass to charge value between SP and EP that represents a point of balance of the peak area above a line between SP and EP.

When used for mixed low and high masses, the centroiding method generates peak positions that are both average masses and monoisotopic masses. Thus, for identification of the compound that caused a specific peak, one must also make further analysis to determine if the value is an average value or a monoisotopic value.

However, this method has a number of drawbacks. For example, when analysing heavy molecules, the peaks of separate isotopes will merge due to the limited resolution of the instrument. Therefore, the centroiding method will yield an average molecule mass.

When analysing a molecule of comparatively low mass, the resolution of the instrument is often sufficient to allow the centroiding method to be used for determining a monoisotopic mass. If such a molecule is used to calibrate the instrument together with the centroiding method, a systematic error will be introduced when analysing heavier molecules, for which the peaks are not resolved. This occurs since the use of the centroiding method for the heavier molecules yields an average mass, as described above, which differs from the monoisotopic mass, i.e. the average mass is always higher than the monoisotopic mass.

In addition, at low concentrations the signal-to-noise ratio becomes low. Therefore, it will be difficult to identify a proper start point SP and end point EP respectively, on which the centroiding method is based.

Furthermore, the centroiding method has a limited sensitivity to the shape of the intensity curve between the low and the high end of the measuring interval.

However, in many circumstances it is of interest to determine the monoisotopic molecular mass of the sample molecule, i.e. the mass of a molecule consisting only of the lowest mass isotopes. For reasons given above, the known methods to analyse a mass spectrum, herein represented by the centroiding method, are not well adapted to determine the monoisotopic molecular mass based on a mass spectrum having badly resolved isotopic peaks. Similarly, the centroiding method is not well adapted to a case wherein the peaks of a heavy molecule are well resolved in them selves, but the intensities of the isotopes of relatively low mass are near the noise level of the signal.

In GB-2,333,893 A (Bruker) there is disclosed a method based on mass spectrometry suitable for accurate determination of unknown ions. This method uses a curve fitting method and a mathematial optimization method to find a best fit between a model spectrum and a measured spectrum. However, it does not adress the problem of unknown m/Z values, for a single family of isotopic peaks.

Therefore, there is a need for an improved method for determining the monoisotopic molecular mass, including the molecular mass-to-charge ratio, of a molecule analysed by mass spectrometry.

SUMMARY OF THE INVENTION

It is an object of the present invention to meet this need. This object is achieved with a method according to claim 1 of the appended claims.

With the method of the invention it is possible to determine the monoisotopic molecular mass-to-charge ratio of a sample molecule with a considerable reliability.

Having determined the monoisotopic molecular mass-to-charge ratio, the monoisotopic mass is obtained by simply multiplying by the number of the associated charge state.

In a specific embodiment of the method of the invention, the method is extended to include determination of the charge state in a case where the charge state is unknown, thereby also allowing monoisotopic mass determination in such a case.

Further scope of applicability of the present invention will become apparent from the detailed description given hereinafter. However, it should be understood that the detailed description and specific examples, while indicating preferred embodiments of the invention are given by way of illustration only. Various changes and modifications within the inventive idea and scope of the invention will become apparent to those skilled in the art from this detailed description.

The present invention will become more fully understood from the detailed description given herein, including the accompanying drawings which are given by way of illustration only, and thus are not limiting the present invention, and wherein FIG. 1 is a schematical representation of a mass spectrum.

DETAILED DESCRIPTION OF PREFERRED EMBODIMENTS

Figure 1:
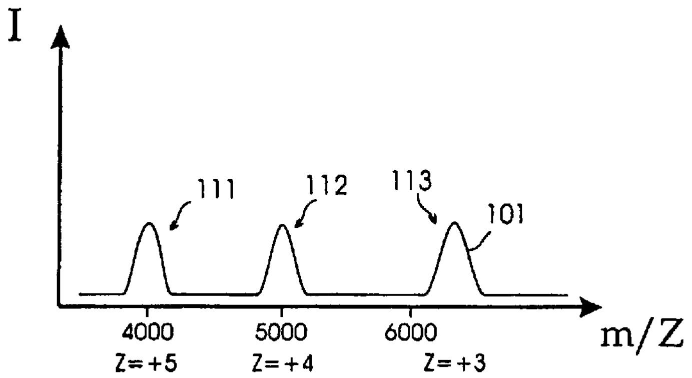

The present invention is based on the insight that, when analysing a sample of a molecule to determine its mass, and especially its monoisotopic mass, it is often possible to predict the general mass distribution of the molecule, although its precise composition is unknown.

According to the invention, a model molecule is determined that corresponds to the predicted mass distribution, i.e. a standard atomic composition for a class of molecules is determined and used with the method. In addition, it is possible to determine the theoretical distribution of isotopes of each element, and it is therefore possible to determine the theoretical occurrence of isotopes in the model molecule based on its suggested mass.

The theoretical isotopic distribution of the model molecule, together with an estimated isotopic peak shape, are used for a cross correlation analysis of the actual mass spectrum of the sample molecule to determine its monoisotopic molecular mass-to-charge ratio.

In addition, the method according to the invention is also useful to determine the charge state (Z) associated with the studied mass spectrum section, in a case where the charge state is not known. Having determined the charge state, the actual monoisotopic mass could be calculated.

In a general aspect, any unknown parameter can be determined by the iterative method according to the invention.

What is needed for practising the invention is a continuous model function describing a family of isotopic peaks can be created $I(M/Z)=f(M,Z,R,F_{elements},\text{parameters})$ with M=monoisotpic mass Z=number of elementary charges R=resolution (peak width divided by peak position)

$F_{elements}$=a vector describing the relative abundancy of different elements for this molecule. This vector could be general for all molecules, or modified if looking for something specific such as the number of sulphur (S) atoms. This vector will be different for different types of molecules. For instance proteins and poly(ethylene) glycol polymers would have different vectors.

parameters=other parameters, such as noise level, or a mass difference to another set of peaks that should be treated together with this Further, a digitized spectrum sampled at discrete points is required.

The method of the invention shall now be described with reference to FIGS. 1–10. It is assumed that the technique of mass spectrometry, as well as the background to the mass spectrum, charge state etc. is known to anyone skilled in the art, and therefore it will not be further explained herein. Similarly, knowledge of the generally known cross correlation technique is assumed.

During this description, the term "cluster" will be used to designate the set of individual isotope peaks of a mass spectrum associated with a specific charge state. Thus, depending on concentration, instrument resolution, sample purity etc. the peaks of each cluster are more or less well resolved and identifiable in the mass spectrum. As described above, using the conventional centroiding method a badly resolved cluster of a heavy molecule is treated more like one broad peak, rather than as being composed of individual isotope peaks.

A schematical large scale mass spectrum 101 of a molecule, such as a bio-molecule, is illustrated in FIG. 1. The spectrum clusters 111, 112 and 113 illustrate representations of the same molecule but at different charge states. In the example of FIG. 1 the cluster 111 represents a charge number Z of +5, the cluster 112 represents a charge number Z of +4, and the cluster 113 represents a charge number Z of +3.

Generally, in the figures the X axis represents the mass-to-charge ratio, m/Z, and the Y axis is the intensity I of the detected mass spectrometer signal representing the sample. It should be understood that the mass spectrum of FIG. 1, as well as of the other figures accompanying this description, is highly simplified and idealized. In practice, individual peaks and even clusters could be difficult to recognize for several reasons, such as a low signal-to-noise ratio.

Figure 2:
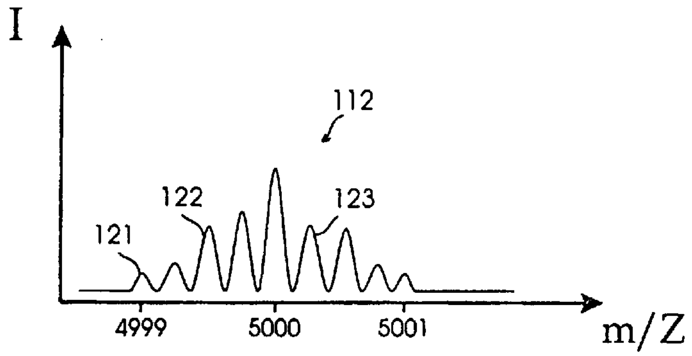
FIG. 2 is a schematical view of a cluster of isotopic peaks, corresponding to a specific charge state, of a mass spectrum.

One of the clusters (cluster 112) is shown enlarged in FIG. 2. When enlarged, the section 112 is resolved into several separate peaks, such as the peaks designated 121, 122, 123.

These peaks represent isotopes of the elements of the molecule. The first peak 121 is the monoisotopic peak, i.e. the peak representing a molecule comprised only of atoms in their lowest mass isotopes, for example $C^{12}$, $N^{14}$, $O^{16}$ etc. The second peak represents those molecules wherein one of the atoms is an isotope having one additional neutron, such as one $C^{13}$ or one $O^{17}$, and so on. Therefore, the subsequent peaks of each cluster represents a statistical distribution of all isotope exchanges possible.

Thus, the determination of the monoisotopic mass-to-charge ratio corresponds to the identification of the first peak of a cluster. To obtain the monoisotopic mass of the molecule, the monoisotopic mass-to-charge ratio should be multiplied with the corresponding charge state.

However, in practice it is often very difficult to separate the peaks of a cluster, or to identify the first peak of a cluster. Therefore, according to the present invention a method for determining the position of the monoisotopic peak of a cluster associated with the sample molecule is provided. Such a method, which has been briefly outlined above, shall now be described in more detail.

According to the invention, a model mass distribution of the elements of the molecule of interest (herein called the sample molecule) shall be assigned, i.e. the mass percentages for the elements such as C, N, O etc. making the sample molecule. This mass distribution should be selected based on a general knowledge of the composition of the sample molecule. The more precisely it is possible to predict the mass distribution, the more reliably will this method determine the monoisotopic mass.

For example, a bio-molecule such as myoglobin, albumin or trypsin, could be represented by a typical "standard" mass percentage distribution of 31% C, 49% H, 9% N and 10% O (1% being various elements, mostly S).

The tendency of each element to exhibit isotopes, i.e. atoms having various numbers of neutrons, is well known. That is, the probability to find a certain isotope among a large number of atoms could, for example, readily be found in an extensive periodic table. Therefore, it is possible to predict the occurrence of a certain isotope in a molecule of a selected size.

Thus, it is possible to determine the most probable distribution of isotopes for each element, this isotope distribution being a function of the total mass of the molecule. A molecule of comparatively small mass should not be expected to include rare isotopes, but the higher the mass is the more likely is it to find rare isotopes due to the large number of atoms. Therefore, an approximation of the mass of the sample molecule should be determined, typically based on an experimentally obtained mass spectrum and a known or assumed charge value.

Thus, having determined a model molecule and selected a model mass, an idealized theoretical mass spectrum could be determined based on the knowledge of the occurrence of isotopes and their influence on a mass spectrometry analysis. This general knowledge is expected to be well known to anyone skilled in the art, and will not be explained herein.

Figure 3:
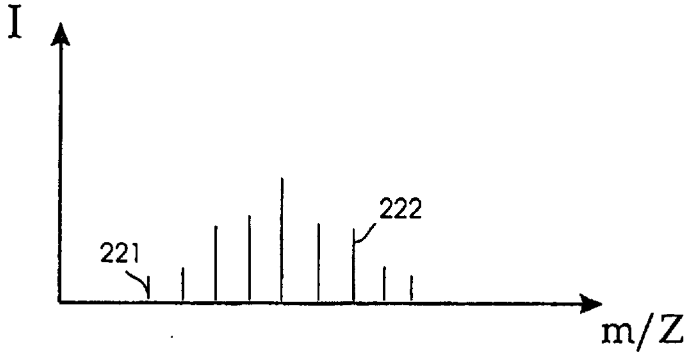
FIG. 3 is a diagram illustrating isotope peaks of a model molecule according to the present invention.

A cluster of such a theoretical mass spectrum (in itself being completely artificial) is illustrated in FIG. 3, for a selected mass-to-charge ratio. The first column of the cluster 221 represents the monoisotopic peak of the cluster, the next column represents molecules of the sample having one neutron more than the monoisotopic molecules and so on (for example represents column 222 those molecules that have seven neutron more than the monoisotopic molecules).

Figure 4:
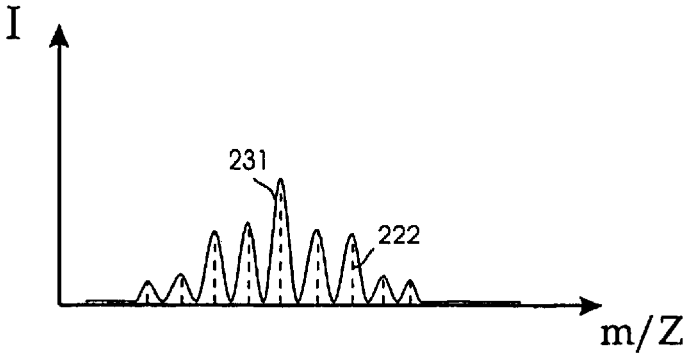
FIG. 4 is a graph showing a model mass spectrum according to the invention.

In order to form a model mass spectrum, similar to an experimental mass spectrum obtained during a real mass spectrometry analysis, the columns representing the isotopes should be connected by a model curve 231, as is shown in FIG. 4. The isotope columns, such as column 222 of FIG. 3, forming the basis for the model curve are depicted with dotted lines.

Figure 5:
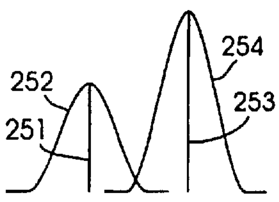
FIGS. 5 and 6 are diagrams illustrating a method for obtaining a model mass spectrum according to the invention.
Figure 6:

The forming of the model mass spectrum could be made using any suitable algorithm. For example, a simple and useful method to create the model curve is illustrated in FIG. 5, wherein two isotope columns 251, 253 are shown, and FIG. 6. A Gaussian curve 252 is assigned to column 251 and a similar curve 254 is assigned to column 253: The separate Gaussian curves 252, 254 are then added to form a model curve 255, as shown in FIG. 6. It should be noted that other curve shapes than Gaussian are possible, such as Lorentzians.

Therefore, a continuous model mass spectrum, which is dependent both on an assumed molecular mass and charge state, could be described as a function:

$$I_{theoretical}=f_{model}(m,Z)$$

Thus, according to a first step of the present invention a model mass spectrum $I_{theoretical}=f_{model}(m, Z)$, representing the expected spectrum for a theoretical molecule, is created.

In a next step, the best possible agreement between the model mass spectrum and the experimental mass spectrum should be determined. This is achieved with the cross correlation technique by positioning the model mass spectrum at numerous selected correlating positions along the experimental mass spectrum and then comparing the spectras. This shall now be described.

When describing this step of the invention, the explanation is simplified by assuming that one cluster only is analysed, i.e. a selected section of the experimental mass spectrum, although any number of clusters could be analysed in the same way. When analysing only a section of the experimental mass spectrum, for example one cluster, the cross correlation technique is used to identify the best local agreement between the experimental mass spectrum and the model mass spectrum.

Furthermore, during this part of the explanation it will be assumed that a cluster representing the charge state Z=1 is analysed. In such a case the molecular mass, although designated $m_Z$, is directly obtained from the scale of the mass spectrum.

The method according to the invention is identical when used at another cluster having a known charge state, for example Z=5, except that the result has to be multiplied by the charge state number to obtain the correct monoisotopic mass value. In the case of a cluster of unknown charge state, this will be described below.

Thus, according to the description above, a model mass spectrum has been determined, and an experimentally obtained mass spectrum is present. Due to the nature of the mass spectrometer instrument, the experimental mass spectrum is not a continuous spectrum but is sampled, i.e. consists of a sequence of measured values obtained at sampling positions along the mass-to-charge ratio scale, each such sampling position separated along the mass-to-charge ratio scale from the next with a sampling interval. This sampling interval is not necessarily constant.

Generally, according to the invention a number of correlating positions $m_{Zcorr}(i)$ are determined. For each such correlating position a quality factor Q(i) is determined, said quality factor representing a measure of the agreement between the experimental mass spectrum and the model mass spectrum, when the later is positioned with its monoisotopic peak coinciding with the correlating position.

A first correlating position along the experimental mass spectrum, i.e. a first value $m_{Zcorr}(1)$ along the mass-to-charge axis, is selected. For example, this position could be selected to a somewhat higher mass value than an expected true monoisotopic molecule mass.

Then, for each successive correlating position $m_{Zcorr}(i)$, the model spectrum is moved an increment, typically a fraction of the sampling interval such as a hundredth of the sampling interval, to the next correlating position. For each correlating position, the intensity values of the model spectrum at the sampling positions of the experimental mass spectrum are calculated using the continuous model mass spectrum function.

The correlating positions are selected such that it is probable that the true monoisotopic peak of the experimental mass spectrum is within the range of the lowest and the highest correlating position.

The cross correlation quality factor Q(i) for each correlating position $m_{Zcorr}(i)$ is determined by creating a comparison value q(j) for each sampling position (or a selection thereof) of the cluster of the experimental mass spectrum, based on the intensity values at the sampling positions of the experimental spectrum, $I_{EXP}(i, j)$, and the model mass spectrum, $I_{MODEL}(i, j)$, for that correlating position i, and then forming the quality factor Q(i) out of these comparison values q(j) for the correlating position $m_{Zcorr}(i)$.

Figure 7:
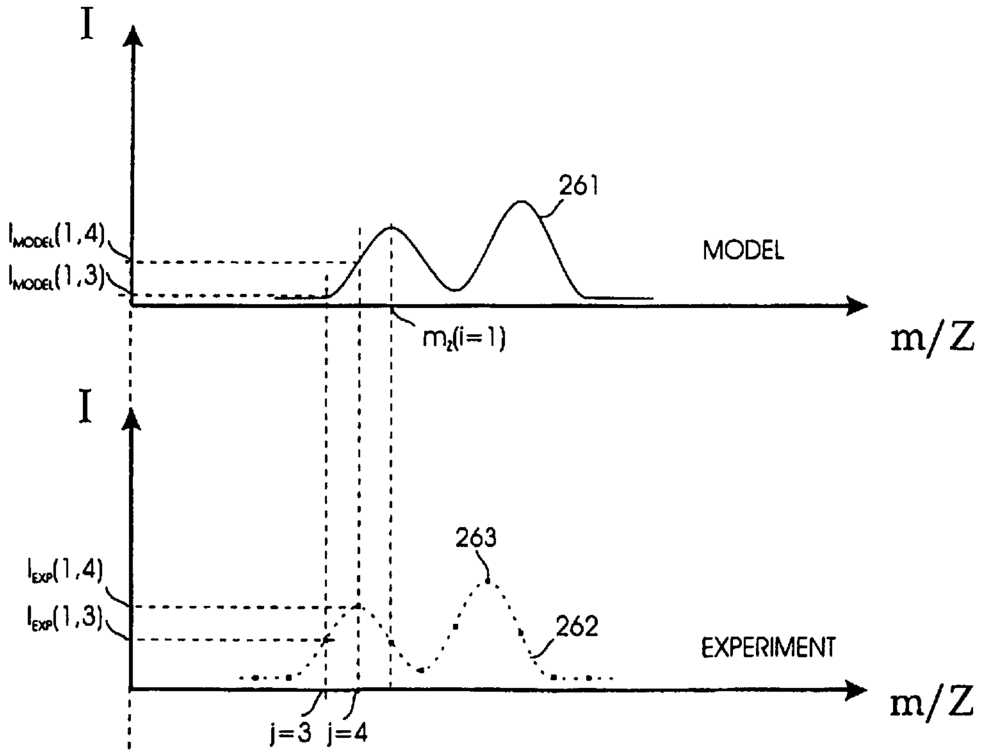
FIG. 7 is a graph illustrating a step of determining a comparison value according to the invention for a first position of a model spectrum with respect to an experimental spectrum.
Figure 8:
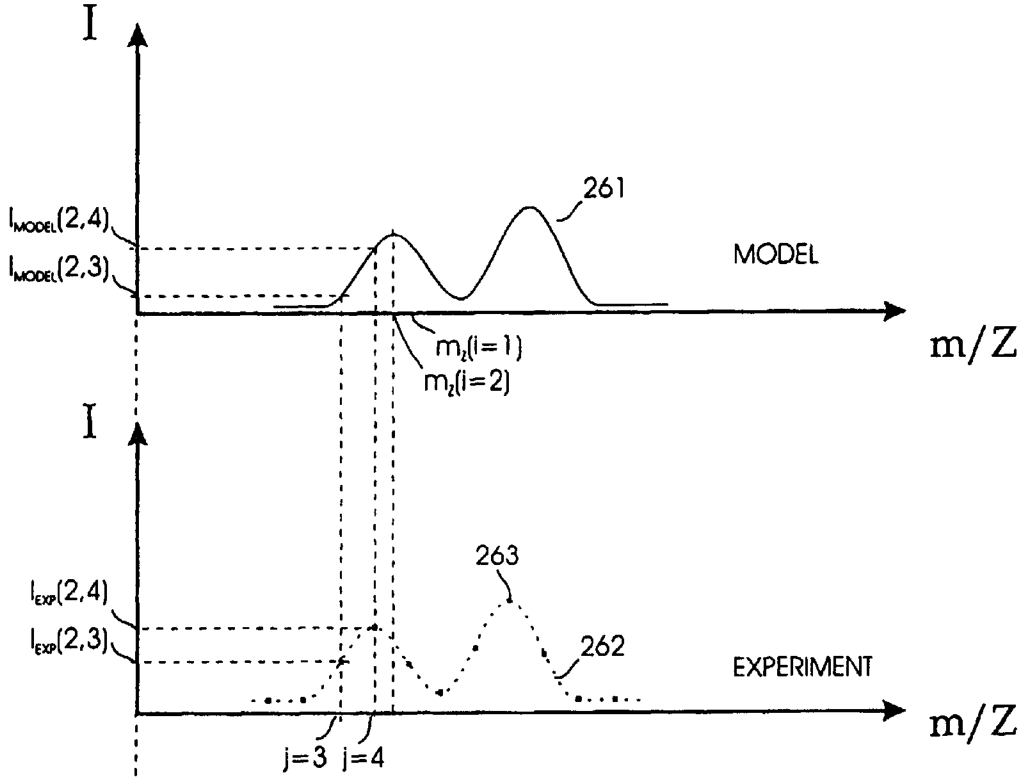
FIG. 8 is a graph illustrating a step of determining a comparison value according to the invention for a second position of a model spectrum with respect to an experimental spectrum.

This is illustrated in FIGS. 7 and 8. In FIG. 7 is shown a simplified model spectrum 261, having its monoisotopic peak at a first position $m_z(i=1)$. Also shown in FIG. 7, vertically displaced for clarity, is the experimental spectrum 262 which is indicated with a thin line, but is actually composed of discrete values at the sampling positions 263.

For each sampling position, i.e. each j, is determined the corresponding intensity values for the experimental spectrum and the model spectrum. This is exemplified in FIG. 7 with the values $I_{MODEL}(1, 3)$, $I_{MODEL}(1, 4)$, $I_{EXP}(1, 3)$ and $I_{EXP}(1, 4)$, indicating values for the correlating position i=1 and the comparing positions 3 and 4.

A comparison value q(j) could be obtained in numerous ways. A simple and useful way is to multiply the intensity values of each comparing position:

$$q(i, j) = I_{MODEL}(i, j) \times I_{EXP}(i, j)$$

After having determined a comparison value for each comparing position j of a correlating position of the model mass spectrum, a quality factor Q(i) is determined for said correlating position i. The object of the quality factor is to provide a value representative for the agreement between the model mass spectrum and the experimental mass spectrum.

Similar to the comparison value, the quality factor Q(i) could be calculated in numerous ways, but a presently preferred method is to simply calculate the sum of all (m) comparison values q(i, j) for the model monoisotopic peak position i:

$$Q(i) = \sum_{j=1}^{m} q(i, j)$$

Using the algorithms described, the Q(i) value will become large when the agreement between the mass spectra is good and will become lower the more the mass spectra deviate from each other.

Other examples on useful algorithms for calculating a quality factor are the $\chi^2$ ("chi-square") coefficient and the Pearson product-moment correlation coefficient.

After having determined the quality factor Q(1) for a first correlating position i=1 of the theoretical monoisotopic peak, a second position i=2 for the theoretical monoisotopic peak $m_Z(2)$ is selected, as described above. This is illustrated in FIG. 8, wherein the increment is approximately half of the sampling interval (although, as described above, a considerably smaller increment is preferred).

A new set of comparison values q(2, j), calculated from the corresponding intensity levels, such as $I_{MODEL}(2, 3)$, $I_{MODEL}(2, 4)$, $I_{EXP}(2, 3)$ and $I_{EXP}(2, 4)$ shown in FIG. 8, are calculated. It should be noted that, for example, $I_{EXP}(1, 3)$ is identical with $I_{EXP}(2, 3)$ since the experimental mass spectrum is constant with respect to the mass scale. Based on the new set of comparison values q(2, j) a second quality factor Q(2) is calculated.

This procedure is repeated for each correlating position i, thereby determining a quality factor for each such position. Therefore, a set of quality factors Q(1, . . . , n) will be obtained, n representing the number of analysed positions of the model mass spectrum with respect to the experimental mass spectrum.

Thus, according to a second step of the present invention a set of quality factors Q(1, . . . , n), each quality factor being indicative of the agreement between the model mass spectrum and the experimental mass spectrum for a selected relative position of the model mass spectrum with respect to the experimental mass spectrum, is determined.

As the quality factor Q is a representation of the agreement between the model mass spectrum and the experimental mass spectrum, that quality factor of the set that indicates the best agreement between the model mass spectrum and the experimental mass spectrum could be identified. In the embodiment described above, wherein the comparison value is obtained by multiplying two intensity values, the quality factor having the highest value indicates the best agreement.

Having determined the quality factor, Q(optimal), that indicates the best agreement, the monoisotopic mass-to-charge ratio of the sample molecule is defined as the mass-to-charge ratio for the monoisotopic peak of the model molecule associated with that quality factor Q(optimal).

Thus, according to a third step of the present invention, the monoisotopic mass-to-charge ratio of the sample molecule is defined as the monoisotopic mass-to-charge ratio of the model monoisotopic peak corresponding to that quality factor Q(i) that indicates the best agreement between the model mass spectrum and the experimental mass spectrum at a correlating position i.

However, in some cases the charge state of a cluster of a experimental mass spectrum is not known. This means, for example, that when a certain peak of the experimental spectrum is positioned at a m/Z-value of 10,000 this could indicate a true mass value of 30,000 mass units in the case of Z=3, but also a mass value of 50,000 in the case of Z=5.

According to the invention, the charge state and, in consequence, the true monoisotopic molecular mass could be determined by repeating the steps above for a sequence of model mass spectra, each one determined for different charge states.

Figure 9:
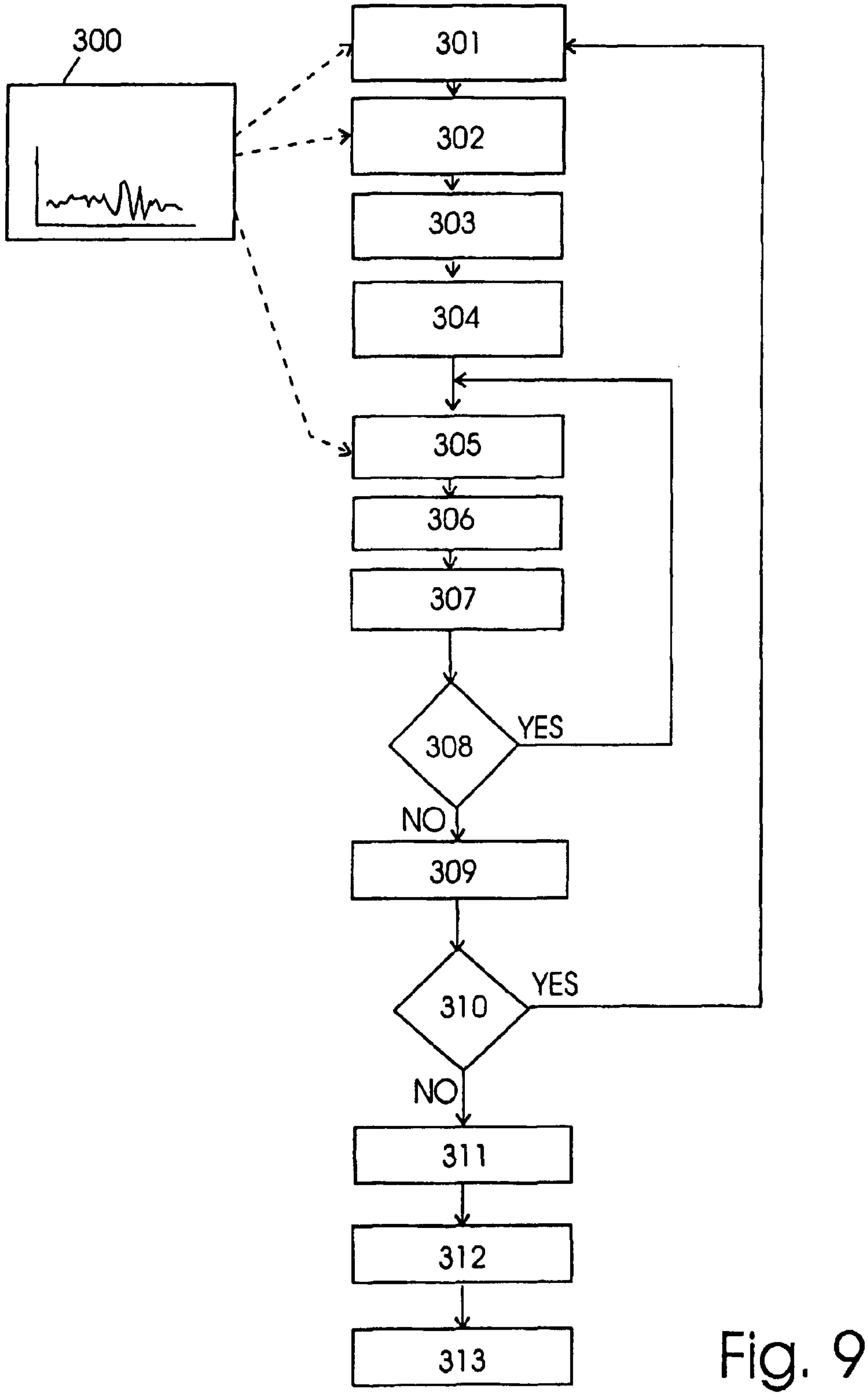
FIG. 9 shows a flow diagram of an embodiment of the method according to the invention.

This is illustrated in the block scheme of FIG. 9, part of which is also representative for the method steps described above and to which reference is made. The separate blocks of the block scheme shall now be explained:

As described above, an experimentally obtained mass spectrum 300 is necessary to practice the method if the invention.

301: Assume a charge state, Z. The assumption, such as Z=1, is based on the experimental spectrum 300, and could be based on any suitable consideration.

302: Determine a model molecule mass, based on the experimental spectrum 300 and the assumed charge state 301, as described above.

303: Determine a statistical isotope distribution, as described above.

304: Form a model mass spectrum, as described above.

305: Position the monoisotopic peak of the model mass spectrum with respect to the experimental mass spectrum 300.

306: For said position of the monoisotopic peak of the model mass spectrum, calculate a set of comparison values q(j) along the spectra, as described above.

307: Use the comparison value set to calculate a quality factor $Q_Z$ for the present position of the monoisotopic peak of the model mass spectrum, as described above, and the present assumption of the charge state.

308: Are there more model spectrum monoisotopic peak positions to analyse? Repeat the steps according to 305, 306, 307 for a selected number of positions for the monoisotopic peak of the model mass spectrum, until all of said positions have been analysed and a quality factor $Q_z(i)$ for each selected model mass spectrum position of the selected charge state has been obtained.

309: Determine the best agreement quality factor for the selected value of Z. Based on the selected algorithm to calculate the quality factors, determine that quality factor that represents the best agreement between the analysed sections of the experimental and the model spectrum.

310: Are there more charge state assumptions to analyse? When the true value of Z is known, the next step would be to actually determine the monoisotopic peak of the sample (312). However, for each new assumption of the charge state the steps 301–309 are repeated. A new value of Z implies a new value of the mass of the model molecule, which in its turn affect the statistical isotope distribution, thereby resulting in a different model spectrum.

Consequently, a set of quality factors, each one being determined as representing the best fit for a selected value of Z, are obtained.

Figure 10:
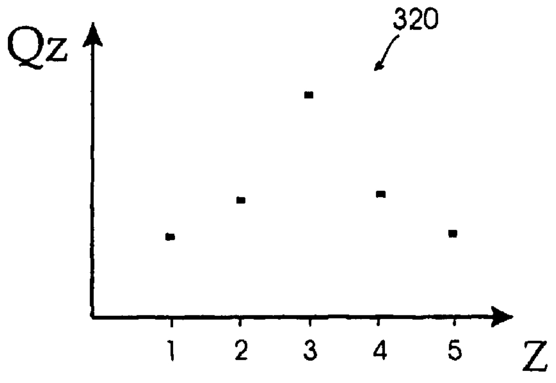
FIG. 10 is a graph illustrating best agreement quality factors obtained for different assumptions of charge state.

311: Determine the over-all best fit quality factor among the best fit quality factors for each assumed Z-value. In FIG. 10 is shown a set of Q-values 320 for different Z-values plotted in a diagram, indicating an example wherein Z=3 is the most likely true Z value. Thus, with the method of the present invention it is possible to estimate a charge state, as well as a monoisotopic mass peak, for a section of an experimental mass spectrum.

312: Determine the position of the monoisotopic peak of the experimental mass spectrum. As described above, the position of the monoisotopic peak of the model mass spectrum that is associated with the quality factor determined as the "best fit" is regarded as the closest approximation of the true position of the monoisotopic peak of the experimental mass spectrum.

313. Determine the monoisotopic mass of the sample molecule. As described above, the monoisotopic mass of the sample molecule is calculated by multiplying the monoisotopic mass peak position of the experimental spectrum by the determined charge state (and, if necessary making test equipment specific correction).

Using the information obtained in the previous steps 300 to 311, the monoisotopic peak as well as the charge state is determined, and a value of the monoisotopic mass of the sample molecule could be calculated 312.

Regarding the step of determining the model molecular mass 302, it should be noted that for each assumed charge state a new model mass is determined. At the same time, a higher model mass will result in a different model mass spectrum 304 due to the higher probability of finding more rare isotopes.

The calculations necessary to practice the present invention are well suited for automation, i.e. they could be performed by a specific program of a general purpose computer or they could be performed by a program embedded in an apparatus built specifically for the purpose.

A more general description of the inventive method will be given below, the above algorithm being a special case where charge state is the parameter that is unknown. Of course there may be other unknown parameters (e.g. number of sulphur atoms in the molecule, an important feature of certain proteins), and the iteration according to the invention can be used to determine these unknown parameters.

1. The simplest operation in this method is the performing of a cross correlation with the model function sampled in the same points as the digitized spectrum. This gives the cross correlation value, telling the goodness of fit. This value may be normalized so that for instance the value 0.73 has a general meaning, or non-normalized, if something of interest such as the noise level is lost in the normalization.
2. The next step is to vary one parameter. For instance allow charge state (Z) to be varied. This should always be done, since the charge state is not known. The mass M (and other dependent parameters) will then have to be calculated so that it matches the M/Z value at which the cross correlation will be calculated. Now, if we vary Z=1, 2, . . . , $N_Z$ we get a vector of goodness values performing the cross correlation as in 1.
3. The next step is to vary yet one parameter for each and every value of previous parameter settings (for instance, the number of sulphurs in the relative abundancy vector may be varied). This would thus create a 2-dimensional array of cross correlation values.
4. Repeat step 3 with as many parameters as wished. An N-dimensional array of cross correlation values will be the result from varying N parameters.
5. Repeat above for each sampled M/Z along the spectrum (thus calculating dependent variables such as M=(M/Z)*M) from peak position (measured M/Z) or other dependencies. Repeat also for a number of points at intervals between the sampled points, to get higher accuracy than only at sample points.
6. Analyze the cross correlations calculated, and identify a peak as the highest cross correlation value. The parameters that generated this correlation value have also been identified. For instance, if Z=2, S=2 (number of sulphurs) gave the highest cross correlation value at M/Z=1000, then a peak was situated at M/Z=1000, with 2 charges, and 2 sulphur atoms.
7. In the case several peaks are of interest, the removal of already identified peaks can be done in several ways. For instance blanking a mass range covered by the isotopic peaks (range known from model function). In the case above, we would blank the range M/Z=999.5 to 1002, if we had 4 major isotopic peaks contributing (compare with model function). Another way would be to model the shape a true peak would give in case it was found (performing an auto-correlation of the model function), match the peak height with the highest correlation, and then subtract from the array of correlation values.
8. Perform further identifications of found peaks as in 7.

Figure 11:
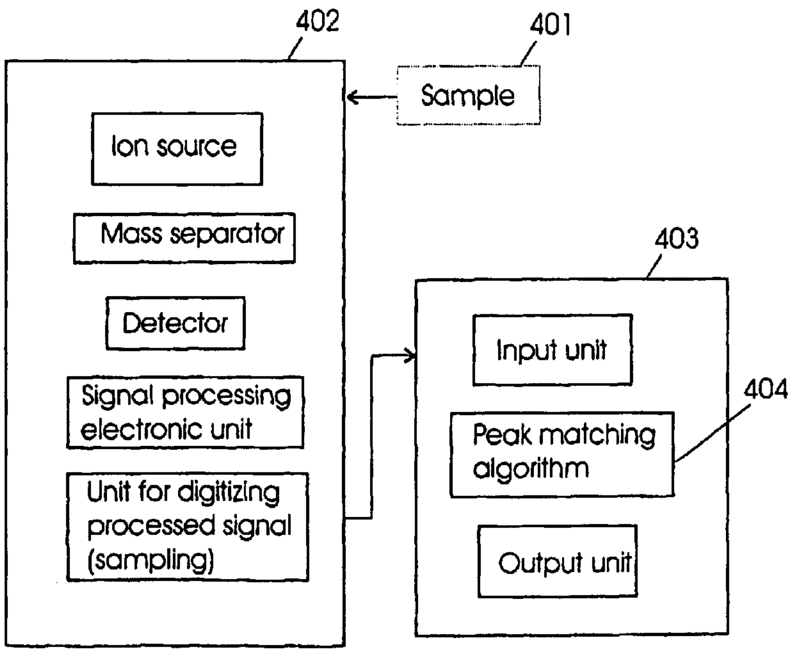
FIG. 11 illustrates a system for practicing the method of the present invention.

A system for practicing the method of the invention is indicated in FIG. 11. A sample 401 is analysed in a mass spectrometer 402. The mass spectrometer is typically a conventional mass spectrometer having an ion source, a mass separator, a detector, a signal processing unit and a unit for digitising the processed signal to output the mass spectrum as intensity values at a number of sampling positions. Although not shown, it is conventional to print a mass spectrum chart based on the output from the mass spectrometer.

An analysing unit 403 includes an input unit to receive the sampled output signal from the mass spectrometer 402 as well as input from an operator, a comparing unit (404) including hardware and software to perform the comparing and analysing steps according to the present invention, and an output unit to output the result of the analyse.

Of course, the components of the system could be provided as separate physical units, or could be integrated into one or a few units. Also, a personal computer having a computer program adapted to perform one or several steps of the method according to the present invention could be used to control the equipment.

It is obvious that the present invention may be varied in many ways with respect to the detailed description above. Such variations are not to be regarded as a departure from the scope of the invention, and all such modifications as would be obvious to one skilled in the art are intended to be included within the scope of the following claims.

What is claimed is:

1. A method for determining the monoisotopic mass of a sample molecule comprising a) experimentally obtaining mass spectrum (300) representative of the sample molecule;

b) comparing at least a portion of said experimentally obtained mass spectrum (300) with a model mass spectrum for said sample molecule as follows:

i) assuming values for one or more unknown parameters including the monoisotopic mass and charge state (Z) of said sample molecule, wherein said parameters describe the peak shape of a model mass spectrum of said sample molecule, ii) calculating a model mass spectrum, including the position of a model monoisotopic mass peak, said model mass spectrum representing an expected spectrum for a theoretical model molecule representative of said assumed values for the unknown parameters of the sample molecule (301–304);

iii) determining a position of said model mass spectrum along the m/Z (mass-to-charge) axis of the experimentally obtained spectrum that provides the best agreement with the experimental mass spectrum using a cross correlation method (305–309) by incrementally moving said spectrum along the m/Z axis of the experimentally obtained spectrum, including the steps of positioning said model mass spectrum along the m/Z axis of the experimental mass spectrum (305);

calculating, for sampling positions of the experimental mass spectrum, comparison values (q; 306) based on the corresponding value of said model mass spectrum at said position;

forming a quality factor (Q; 307) based on said comparison values, said quality factor representing the agreement between the experimental mass spectrum and said model mass spectrum at said position;

repeating the steps above (305, 306, 307) for a set of positions for said model mass spectrum along the mass-to-charge axis of the experimental mass spectrum (308) to obtain a set of quality factors; and selecting that quality factor (Q) that indicates the best agreement between the experimental mass spectrum and said model mass spectrum, and selecting the position of said model mass spectrum associated with said best agreement quality factor as the best agreement with the experimental mass spectrum (309);

repeating steps i)–iii) a selected number of times (310), each time calculating a modified model mass spectrum based on a modified assumption of the values of said unknown parameters;

c) selecting the model spectrum having the highest correlation, and taking the monoisotopic mass associated therewith as the true monoisotopic mass for the sample molecule.

2. The method according to claim 1, wherein the unknown parameters are selected from the group consisting of monoisotopic mass, charge state, relative abundance of atomic elements in the sample molecule, noise level, resolution (peak width divided by peak position), and a mass difference to another set of peaks.

3. The method according to claim 2, further including the steps of comparing the best agreement quality factors of each assumption of a charge state to determine the over all best agreement quality factor (311); and using said over all best agreement quality factor as representing both the charge state of the analyzed section of the experimental mass spectrum, and the best agreement between said model mass spectrum and the experimental mass spectrum (312), thereby allowing for calculation of the monoisotopic mass of the sample molecule.

4. A system for determining the monoisotopic mass peak of a sample molecule comprising a mass spectrometer (402), and an analyzing unit (403), wherein said analyzing unit includes an input unit for receiving a signal representing the experimental mass spectrum, a comparing unit (404) having electronic circuitry and being controlled by a computer program for performing the method of claim 1, and an output unit for outputting a signal from said comparing unit.

5. An apparatus for analyzing an experimentally obtained mass spectrum representing a sample molecule in order to determine the monoisotopic mass of the sample molecule, comprising an input unit for receiving a signal from a mass spectrometer (402) representing an experimental mass spectrum, a comparing unit (404) having electronic circuitry and being controlled by a computer program for performing the method of claim 1, and an output unit for outputting a signal from said comparing unit.

* * * * *